United States Patent
Hoshino et al.

(10) Patent No.: US 8,970,953 B2
(45) Date of Patent: *Mar. 3, 2015

(54) IDENTIFICATION MEDIUM AND IDENTIFICATION METHOD THEREFOR

(75) Inventors: Hidekazu Hoshino, Yokohama (JP); Itsuo Takeuchi, Yokohama (JP); Tokio Sakauchi, Yokohama (JP); Seiya Shibuya, Yokohama (JP); Tohru Ida, Yokohama (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 113 days.

This patent is subject to a terminal disclaimer.

(21) Appl. No.: 13/509,916
(22) PCT Filed: Nov. 12, 2010
(86) PCT No.: PCT/JP2010/070212
§ 371 (c)(1), (2), (4) Date: May 15, 2012
(87) PCT Pub. No.: WO2011/065242
PCT Pub. Date: Jun. 3, 2011

(65) Prior Publication Data
US 2012/0236292 A1 Sep. 20, 2012

(30) Foreign Application Priority Data
Nov. 27, 2009 (JP) .................................. 2009-270012

(51) Int. Cl.
*G03H 1/00* (2006.01)
*G02B 5/30* (2006.01)
(Continued)

(52) U.S. Cl.
CPC ............... *G03H 1/0256* (2013.01); *B42D 25/29* (2014.01); *G02B 5/3016* (2013.01);
(Continued)

(58) Field of Classification Search
CPC ...... G02B 5/3016; G02B 5/3083; G02B 5/32; G03H 1/0011; G03H 2250/40; G03H 2250/42; G03H 2222/31; B42D 15/0013; B42D 15/10; B42D 15/105; B42D 2033/10; B42D 2033/26
USPC ............... 359/2, 15, 485.01–485.04, 485.07, 359/487.01, 487.02, 487.04, 487.05, 359/491.01, 492.01; 283/86, 90, 94

See application file for complete search history.

(56) References Cited

U.S. PATENT DOCUMENTS 5,284,364 A * 2/1994 Jain ................................. 283/87
6,061,122 A 5/2000 Hoshino et al.
(Continued)

FOREIGN PATENT DOCUMENTS

EP 1 628 147 A1 2/2006
EP 2 006 750 A2 12/2008
(Continued)

OTHER PUBLICATIONS

Oct. 18, 2013 Office Action issued in Korean Patent Application No. 10-2012-7015742 w/translation.
(Continued)

*Primary Examiner* — Thomas K Pham
*Assistant Examiner* — Nicholas Pasko
(74) *Attorney, Agent, or Firm* — Oliff PLC

(57) ABSTRACT

An identification medium is provided in which latent image having plural colors can be observed even when the identification medium is spaced away from a polarization filter. A cholesteric liquid crystal layer is provided as a specific polarization light reflection layer which reflects light having a specific polarized condition. An optical anisotropic layer having an optical anisotropy is provided at an upper position overlapping with the specific polarization light reflection layer. An image A fanned by an area having an optical anisotropy different from that of surroundings is formed at the optical anisotropic layer. When the identification medium is directly viewed, the influence of the optical anisotropy cannot be seen. When the identification medium is observed via a circular polarization filter, the image can be seen to have a specific color by the influence of the optical anisotropy.

4 Claims, 2 Drawing Sheets

(51) Int. Cl.
  *G02B 27/28* (2006.01)
  *G06K 9/74* (2006.01)
  *G03H 1/02* (2006.01)
  *B42D 25/29* (2014.01)
  *B42D 25/328* (2014.01)
  *B42D 25/391* (2014.01)

(52) U.S. Cl.
  CPC ........ *B42D 2033/10* (2013.01); *B42D 2033/26* (2013.01); *B42D 2035/24* (2013.01); *G03H 1/0244* (2013.01); *G03H 2250/14* (2013.01); *G03H 2250/36* (2013.01); *G03H 2250/38* (2013.01); *B42D 25/328* (2014.01); *B42D 25/391* (2014.01)
  USPC ............. 359/485.03; 356/71; 349/98; 359/2; 359/15

(56) References Cited

U.S. PATENT DOCUMENTS

| | | | |
|---|---|---|---|
| 6,344,887 B1 * | 2/2002 | Ma et al. | 349/98 |
| 6,496,287 B1 * | 12/2002 | Seiberle et al. | 359/15 |
| 6,628,439 B2 * | 9/2003 | Shiozawa et al. | 359/2 |
| 6,806,930 B2 * | 10/2004 | Moia | 349/117 |
| 7,179,393 B2 * | 2/2007 | Isherwood et al. | 216/23 |
| 7,201,821 B2 * | 4/2007 | Hoshino et al. | 156/277 |
| 7,391,546 B2 * | 6/2008 | Hoshino et al. | 359/2 |
| 7,443,585 B2 * | 10/2008 | Hara et al. | 359/489.15 |
| 7,862,880 B2 * | 1/2011 | Katschorek et al. | 428/172 |
| 7,940,436 B2 * | 5/2011 | Kumasawa | 359/2 |
| 7,943,392 B2 * | 5/2011 | Hoshino et al. | 436/170 |
| 8,493,659 B2 * | 7/2013 | Suzuki et al. | 359/489.01 |
| 8,514,354 B2 * | 8/2013 | Amimori et al. | 349/117 |
| 2006/0232734 A1 * | 10/2006 | Schadt et al. | 349/117 |
| 2007/0081144 A1 * | 4/2007 | Hoshino et al. | 356/71 |
| 2008/0143926 A1 | 6/2008 | Amimori et al. | |
| 2009/0310195 A1 * | 12/2009 | Suzuki et al. | 359/2 |
| 2010/0123943 A1 * | 5/2010 | Umemoto et al. | 359/2 |
| 2011/0043911 A1 | 2/2011 | Kaneiwa et al. | |
| 2012/0262767 A1 * | 10/2012 | Ida | 359/2 |

FOREIGN PATENT DOCUMENTS

| | | | | |
|---|---|---|---|---|
| EP | 2 085 799 A1 | | 8/2009 | |
| EP | 2085799 A1 | * | 8/2009 | ............... G02B 5/30 |
| EP | 2085799 A1 | * | 8/2009 | |
| JP | B-3652487 | | 5/2005 | |
| JP | A-2007-001130 | | 1/2007 | |
| JP | A-2007-279129 | | 10/2007 | |
| JP | A-2008-139508 | | 6/2008 | |
| JP | A-2008-139510 | | 6/2008 | |
| JP | A-2009-069793 | | 4/2009 | |
| JP | A-2009-175208 | | 8/2009 | |
| JP | A-2009-222775 | | 10/2009 | |

OTHER PUBLICATIONS

International Search Report issued in International Application No. PCT/JP2010/070212 dated Dec. 21, 2010.

Oct. 3, 2013 Japanese Office Action issued in Japanese Patent Application No. JP2011-543210 (with English translation).

Extended Search Report issued in European Patent Application No. 10833089.5 dated Jun. 3, 2013.

* cited by examiner

IDENTIFICATION MEDIUM AND IDENTIFICATION METHOD THEREFOR

TECHNICAL FIELD

The present invention relates to an identification medium and an identification medium therefor.

BACKGROUND ART

In Japanese Patent No. 3652487, an identification medium having a cholesteric liquid crystal layer subjected to hologram processing is described. In Japanese Unexamined Patent Application Publication No. 2007-1130, an identification medium is described in which a phase difference layer is stacked on a reflection layer, a phase difference is changed at a portion thereof by heating, and a latent image is thereby observed via a polarization filter. In Japanese Unexamined Patent Application Publication No. 2009-175208, an identification medium is described in which an area in which a phase difference is different is provided, and a latent image having a different color is thereby observed via a polarization filter.

In the technique disclosed in Japanese Patent No. 3652487, an image having a specific color can be used for identification. However, when a light reflected from one cholesteric liquid crystal layer is used, an image having plural colors (for example, an image having green and red) cannot be used for identification. In the techniques disclosed in Japanese Unexamined Patent Application Publications Nos. 2007-1130 and 2009-175208, when the polarization filter is spaced away from the identification medium, lights having various phase conditions enter the identification medium. Thus, selectivity of reflection wavelength due to the phase difference layer (that is, characteristics that light of specific wavelength selectively passes through the phase difference layer) and specific polarized characteristics of light passing therethrough may be weak, so that the observed image and the color thereof may be unclear. Due to this, in order to obtain identification function from the identification medium, it is necessary that the polarization filter be contacted to or be disposed close to the identification medium. As a result, use of the identification medium may be limited.

DISCLOSURE OF THE INVENTION

The present invention was made in consideration of the above circumstances. An object of the present invention is to provide an identification medium in which latent image having plural colors can be observed even when the identification medium is spaced away from a polarization filter.

According to one aspect (claim 1) of the present invention, an identification medium includes: a specific polarization light reflection layer which reflects light having specific polarized condition; and an optical anisotropic layer which is disposed at a position overlapping with the specific polarization light reflection layer and has an optical anisotropy in a plane, wherein a first image formed by an area having optical anisotropy different from that of another area is provided at the optical anisotropic layer.

In the aspect (claim 1) of the present invention, incident light, which has the specific polarized condition and enters the identification medium is reflected by the specific polarization light reflection layer. The specific polarized condition may be a linear polarization having an amplitude component of specific direction, a right circular polarization, or a left circular polarization.

For example, a cholesteric liquid crystal layer may be used as the specific polarization light reflection layer. In this case, circularly polarized light having a specific polarization and a specific center wavelength is reflected by the cholesteric liquid crystal layer. This reflection light may pass through the optical anisotropic layer, and may exit to the outside of the identification medium as reflection light from the identification medium. When the circularly polarized light having a specific polarization and a specific center wavelength passes through the optical anisotropic layer, the polarized condition is changed to elliptical polarization by a birefringence effect (linear polarization exists as an extreme value of elliptical polarization).

When the identification medium is directly viewed, since difference in polarized condition cannot be distinguished by the naked eye, the change in polarized condition by the optical anisotropic layer cannot be observed, and reflection light, which exits from the cholesteric liquid crystal layer positioned below the optical anisotropic layer, can be observed. In this case, the first image cannot be observed (or the observation of the first image may be difficult).

For example, in a case in which the cholesteric liquid crystal layer selectively reflects a right circularly polarized light, when the identification medium is observed via a right circular polarization filter allowing a right circularly polarized light to selectively pass therethrough, a right circularly polarized light component can be selectively observed. In this case, in the light passing through the portion of the first image of the optical anisotropic layer, the polarized condition is changed by the birefringence effect. Thus, the light passing through the portion of the first image of the optical anisotropic layer also includes a polarized light component other than right circularly polarized light component. This change in polarized condition is caused by the difference in refractive indexes of perpendicular directions in a plane of the optical anisotropic layer, and depends on wavelength. Thus, the difference of polarized condition caused by passing through the optical anisotropic layer influences the wavelength distribution (spectrum of wavelength) of the specific polarized light thereof in case in which the specific polarized light is selectively seen.

Therefore, when only a circularly polarized light component of specific polarized direction, which is included in reflection light which is generated from the optical anisotropic layer, passes through the polarization filter, the color of the light component is seen depending on the change degree of the polarized condition provided by the optical anisotropic layer. As a result, the color of the first image is seen to be different from that of the surroundings.

When the identification medium is observed via a circular polarization filter allowing a circularly polarized light of which a polarized direction is opposite to that of the above feature to selectively pass therethrough, a circularly polarized light component of which a polarized direction is opposite to that of the above feature is seen, so that the color of the first image is seen to be different from that of the above feature.

In the above manner, the first image which is not observed by direct viewing can be seen in the observation using the right circular polarization filter and in the observation using the left circular polarization filter. In addition, a latent image effect can be obtained in which the color of the identification medium can be seen to be different between the case of using the right circular polarization filter and the case of using the left circular polarization filter.

The circularly polarized light having a specific polarization is reflected by the cholesteric liquid crystal layer, and the light of another wavelength passes through the cholesteric liquid crystal layer. Thus, even when the circular polarization filter is spaced away from the identification medium, the above optical principle is not changed, and the above optical effects can be obtained.

If the lower portion positioned below the optical anisotropic layer is a simple reflection surface (for example, a metal reflection layer), when the polarization filter is spaced away from the identification medium, polarized degree of the incident light entering the identification medium may be lost. Thus, the polarized degree of the light entering the optical anisotropic layer from the lower portion may be lost. As a result, the polarized condition of light observed by the viewer after passing through the optical anisotropic layer becomes similar to that of natural light. Thus, the polarized condition included in the light approaches a random condition, so that wavelength-dependent characteristics of the polarized condition may be decreased. Due to this, even when the identification medium is observed via a polarization filter, it may be difficult to distinguish the wavelength difference (color difference) depending on the specific polarized condition. That is, when the polarization filter is spaced away from the identification medium, the optical function of the identification medium may be deteriorated, and finally, the identification function may not be obtained.

The same optical function as in the case of using the cholesteric liquid crystal layer as the specific polarization light reflection layer can be obtained in a case of using a structure in which a metal reflection layer and a linear polarization filter layer are stacked as the specific polarization light reflection layer. In this case, linearly polarized light, of which a polarized direction is a specific direction, of the incident light, is reflected by the specific polarization light reflection layer. This linearly polarized light is changed to elliptically polarized light when passing through the optical anisotropic layer.

When the light exiting from the optical anisotropic layer is directly viewed, since the change in polarized condition cannot be distinguished, the first image formed at the optical anisotropic layer cannot be observed. When the identification medium is observed via a linear polarization filter for observation, a light component of a predetermined axial direction, which is included in the elliptically polarized light exiting from the optical anisotropic layer, passes through the linear polarization filter for observation, and the light component can be seen. The center wavelength of this light component is different depending on the degree of phase difference provided in the optical anisotropic layer, so that the color of the first image is seen to be different from that of the surroundings. When the linear polarization filter for observation is rotated (or when the identification medium is rotated), linearly polarized light of a direction different from that of the above feature is seen, and the gradation and the color of the image are changed.

In order to perform the above action, it is necessary that optical axes of the linear polarization filter layer and the optical anisotropic layer be different from each other. In this structure, even when the linear polarization filter for observation is spaced away from the identification medium, the above optical function cannot be lost. This is because the condition of reflection light from the identification medium is the same as in the above feature by the function of the linear polarization filter layer even when the linear polarization filter for observation is spaced away from the identification medium and natural light enters the identification medium.

In the above explanation, the case may be used in which the identification medium is observed via the circular polarization filter when the cholesteric liquid crystal layer is used as the specific polarization light reflection layer, and the case may be used in which the identification medium is observed via the linear polarization filter when the structure, in which the metal reflection layer and the linear polarization filter layer are stacked, is used as the specific polarization light reflection layer. Alternatively, in the former case, a linear polarization filter may be used as the optical filter for observation, and in the latter case, a circular polarization filter may be used as the optical filter for observation In the aspect (claim 1) of the present invention, the number of the images may be plural. The number of the images may be plural, and phase differences of the lights generated in the images may be different from each other, so that latent images different from each other in color can be simultaneously observed. Characters, figures, backgrounds, and various patterns may be used as the images. In the image, areas different from each other in optical anisotropy may be included.

In the aspect (claim 1) of the present invention, even when the polarization filter for observation is proximate to or contacts the identification medium, the same identification function can be obtained. That is, in the aspect (claim 1) of the present invention, even when the polarization filter for observation contacts or is spaced away from the identification medium, identification function can be obtained in which different color display can be observed as latent image.

According to a preferred embodiment (claim 2) of the present invention, the specific polarization light reflection layer may be a cholesteric liquid crystal layer.

According to a preferred embodiment (claim 3) of the present invention, the specific polarization light reflection layer has a structure having a metal reflection layer and an optical filter layer which are stacked, the optical filter layer allowing a linearly polarized light of specific direction to selectively pass therethrough.

According to a preferred embodiment (claim 4) of the present invention, the specific polarization light reflection layer may have a structure having a metal reflection layer and a circularly polarized light filter layer which are stacked, the circular polarized light filter layer allowing a circular polarized light of specific polarized direction to selectively pass therethrough when natural light enters an observation surface side of the identification medium. The structure in which the metal reflection layer and the circularly polarized light filter layer are stacked may have another layer (a bonding layer or the like) disposed therebetween, or it may not have another layer.

According to a preferred embodiment (claim 5) of the present invention, the specific polarization light reflection layer may have a hologram processed portion.

A hologram using reflection light from cholesteric liquid crystal may be superior in that counterfeiting thereof is difficult. That is, in an embossing hologram processed portion which is formed at a typical transparent material and has a reflection layer made of vapor deposited Al or the like, a photosensitive material may closely contact on the embossing hologram processed portion, and in this condition, the photosensitive material may be exposed to interference of a laser beam or the like, so that an embossed structure (asperity structure) forming a hologram processed portion can be relatively easily copied (contact copy). On the other hand, the cholesteric liquid crystal layer may selectively reflect light of a specific center wavelength. Thus, in the above copy technique, a photosensitive material in which photosensitivity corresponds to reflection spectrum characteristics of the cholesteric liquid crystal layer may be necessary. However, it may be difficult to prepare a photosensitive material in which photosensitivity corresponds to reflection spectrum characteristics of the cholesteric liquid crystal layer. Thus, it may be difficult to copy a hologram processed portion provided on a cholesteric liquid crystal layer unless original plate is obtained.

According to another aspect (claim 6) of the present invention, an identification method includes: a step of observing the identification medium according to one of the aspect (claim 1) and the preferred embodiments (claims 2 to 5) via a polarization filter which is spaced from the identification medium and allows a polarized light of specific direction to selectively pass therethrough. In this aspect (claim 6) of the present invention, even when the polarization filter is spaced from the identification medium, reflection light having colors of the identification medium can be observed, and identification using this can be performed. The polarization filter allowing a polarized light of specific direction to selectively pass therethrough may be a linear polarization filter, a right circular polarization filter, or a left circular polarization filter.

EFFECTS OF THE INVENTION

According to the present invention, an identification medium can be provided in which a latent image having plural colors can be observed even when the identification medium is spaced away from a polarization filter.

EXPLANATION OF REFERENCE NUMERALS

Figure 1A:
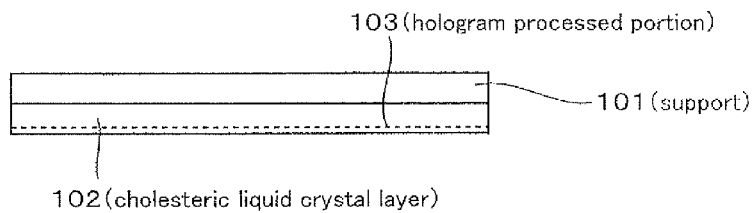
FIGS. 1A to 1C are cross sectional views showing production processes for an identification medium of an embodiment.

Reference numeral 100 denotes an identification medium, reference numeral 200 denotes an identification medium, and reference numeral 300 denotes an identification medium.

Embodiments of the Invention

1. First Embodiment
(Identification Medium 1)

Figure 1B:
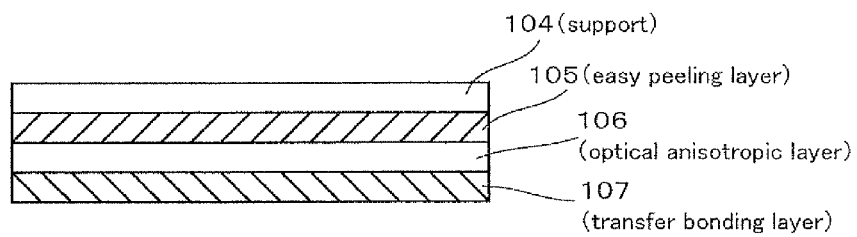
Figure 1C:
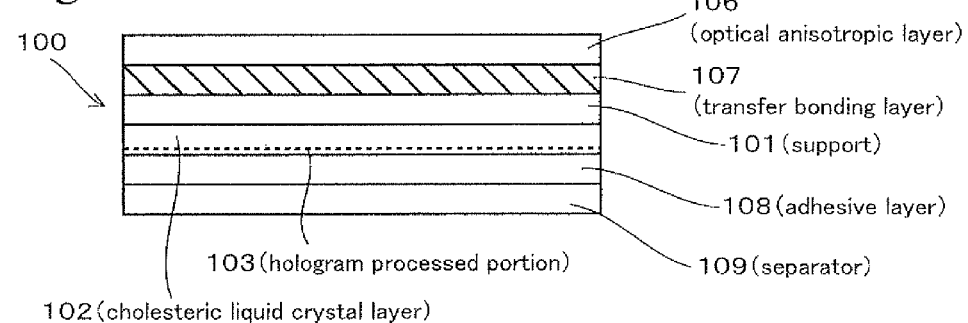

One example of an identification medium, which uses a cholesteric liquid crystal layer as a specific polarization light reflection layer, will be explained hereinafter. FIGS. 1A to 1C are cross sectional views showing production processes for an identification medium 100 of an embodiment. First, an outline of the production processes will be explained. First, as shown in FIG. 1A, a support 101 is prepared. The support 101 is made from a material which allows observation light to pass therethrough and which does not disturb a polarized condition of transmission light. In this example, a TAC (triacetylcellulose) film is used as the support 101. After the support 101 is prepared, a cholesteric liquid crystal layer 102 is formed on a surface of the support 101. The cholesteric liquid crystal layer 102 selectively reflects a right circularly polarized light having a center wavelength of green. Then, a hologram block (embossing block) is pressed to an exposed surface of the cholesteric liquid crystal layer 102, and an asperity which functions as a diffraction grating is formed thereon, so that a hologram processed portion 103 is formed. In this manner, the condition shown in FIG. 1A is obtained.

Next, as shown in FIG. 1B, an appropriate support 104 (for example, PET film (polyethylene terephthalate film)) is prepared, and an easy peeling layer 105 is formed on a surface thereof. The easy peeling layer 105 is made of an adhesive material or a bonding agent which allows easy peeling. After the easy peeling layer 105 is formed, an optical anisotropic layer 106 is formed on an exposed surface thereof.

The optical anisotropic layer 106 is made of an oriented polymer material having birefringence property. In this case, when the polymer material is exposed to light, polymerization reaction of the polymer material occurs, and the oriented condition thereof is determined. The polymer material in the optical anisotropic layer has reactive groups which are unreacted. When the polymer material is exposed to light, polymerization reactions start in the reactive groups which are unreacted, and bridging of polymer chain occurs. In this case, the bridging degree of polymer chain is different depending on light exposure conditions, and a retardation value is thereby changed and a birefringence pattern is formed.

The optical anisotropic layer 106 may have a retardation value of 5 nm or more at a temperature of 20 degrees C. In this case, the retardation value of 10 nm to 1000 nm is desirable, and the retardation value of 20 nm to 2000 nm is the most desirable.

In this example, the following method is used as a production method for an optical anisotropic layer. That is, a solution including a liquid-crystalline compound having at least one reactive group is coated and dried, so that liquid crystal phase is formed. Then, the material having the liquid crystal phase is subjected to ionizing radiation, thereby being polymerized and fixed. Thus, the optical anisotropic layer is formed. This method is disclosed in Japanese Unexamined Patent Application Publication No. 2009-175208. In this Publication, another method is disclosed as a production method for an optical anisotropic layer. A method is disclosed in which a layer, which includes a monomer having at least two reactive groups and is polymerized and fixed, is stretched. A method is disclosed in which a reactive group is supplied to a layer of a polymer by using a coupling agent and the layer is stretched. A method is disclosed in which a reactive group is supplied to a layer of a polymer by using a coupling agent, and then the layer is stretched. A method is disclosed in which a layer of polymer is stretched, and then a reactive group is supplied to the layer. As described below, the optical anisotropic layer of the present invention may be formed by transfer. The desirable thickness of the optical anisotropic layer 106 is 0.1 μm to 20 μm, and the more desirable thickness of the optical anisotropic layer 106 is 0.5 μm to 10 μm.

One example of a formation process of the optical anisotropic layer 106 will be explained hereinafter. First, a composition (for example, application liquid) including a liquid-crystalline compound is coated on the easy peeling layer 105 which was subjected to orientational process. In this example, a material including rod-like liquid crystal, horizontal orientation agent, cationic photopolymerization initiator, polymerization control agent, and methyl ethyl ketone which are mixed, is used as the liquid-crystalline compound. After an oriented condition having a desirable liquid crystal phase is obtained in the material, the oriented condition is fixed by ionizing radiation.

In this example, the oriented condition of the oriented liquid-crystalline compound is fixed by photo-polymerization. The energy of the light illumination is selected at 25 to 800 mJ/cm$^2$. Ultraviolet light, of which a wavelength peak is 250 to 450 nm, is used as the illumination light.

Figure 2:
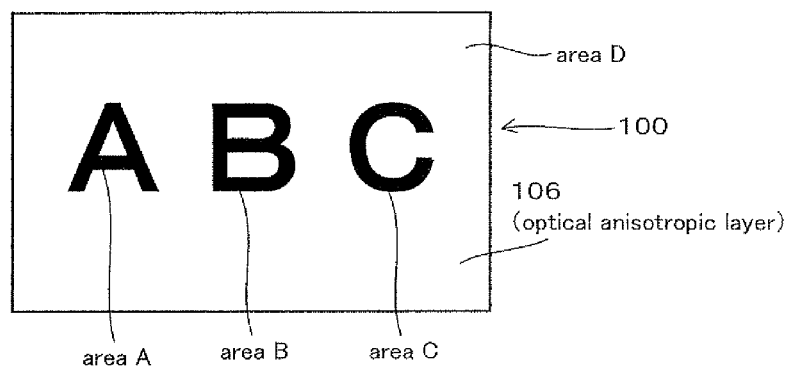
FIG. 2 is a front view showing an optical anisotropic layer of an embodiment.

In this case, pattern exposure is performed on the pattern shown in FIG. 2, so that the phase difference (birefringence effect) of transmission light generated in area A, the phase difference (birefringence effect) of transmission light generated in area B, and the phase difference (birefringence effect) of transmission light generated in area C are adjusted so as to be different from each other. That is, each optical anisotropy of the areas A to C is adjusted so as to be different.

This adjustment is performed by change in light amount (exposure amount) of illuminated light. After that, the material is subjected to heating at 200 degrees C., so that the fixed condition of the oriented condition is determined depending on the light amount of the illuminated light, so that the optical anisotropic layer 106, in which the birefringence condition is partially different, is obtained. When light is not illuminated on the area, the oriented condition is disturbed in the heating, and the birefringence of the area is lost (a simple light transmission layer is obtained). The above heating can be performed at a temperature selected from the range of 50 to 400 degrees C.

In this manner, the optical anisotropic layer 106 is obtained such that refractive indexes of perpendicular directions in a plane are different, and the areas A to C are different from each other in a difference condition of the refractive index. In this example, in observation using a polarization filter, phase differences generated in the areas A to C are set such that the colors of the areas A to C are seen so as to be different from each other. The area D is formed as a simple light transmission area having no anisotropy of refractive index.

After the optical anisotropic layer 106 shown in FIG. 1B is obtained, a transfer bonding layer 107 is formed at an exposed surface of the optical anisotropic layer 106. The transfer bonding layer 107 is made by using a bonding material having optical transparency. In this manner, the condition shown in FIG. 1B is obtained.

Next, the transfer bonding layer 107 of the laminate shown in FIG. 1B is applied onto an exposed surface of the support 101 of the laminate shown in FIG. 1A, and the support 101 and the transfer bonding layer 107 are bonded to each other by bonding function of the transfer bonding layer 107. Next, an adhesive layer 108 is provided to an exposed surface of the cholesteric liquid crystal layer 102. The adhesive layer 108 has an added dye which is black or dark and an added pigment. A separator 109 functioning as peeling paper is applied onto the adhesive layer 108. Next, the easy peeling layer 105 is peeled from the optical anisotropic layer 106, so that the identification medium 100 shown in FIG. 1C is obtained.

In the identification medium 100 shown in FIG. 1C, as seen from the viewer side (the upper side in FIG. 1C), the optical anisotropic layer 106 and the cholesteric liquid crystal layer 102 are stacked. When the identification medium 100 is fixed to an article to be identified, the separator 109 is peeled, and then the identification medium 100 is fixed to the article by the adhesive function of the adhesive layer 108.

In this example, the adhesive layer 108 also functions as a light absorption layer absorbing light which enters from the optical anisotropic layer 106 and passes through the cholesteric liquid crystal layer 102. In this embodiment, the example, in which the adhesive layer 108 functions as a light absorption layer, is explained. Alternatively, when the adhesive layer 108 is optically transparent, the identification medium 100 is optically transparent, and the surface of the article can be seen through the identification medium 100. The above explanation uses examples, and this embodiment is limited to this examples.

(Optical Function of Identification Medium 1)

First, a case in which the identification medium 100 is directly viewed will be explained. In this case, a right circularly polarized light, which has a center wavelength of green, of light entering from the optical anisotropic layer 106 of the identification medium 100, is reflected from the cholesteric liquid crystal layer 102 to the upper side of the Figure. The reflection light of right circularly polarized light having a center wavelength of green passes through the optical anisotropic layer 106 from the lower side to the upper side of the Figure.

In this case, when the right circularly polarized light having a center wavelength of green passes through the areas A to C of the optical anisotropic layer 106, the right circularly polarized light gradually changes into elliptically polarized light such that balance of phase components perpendicular to each other is lost. The change to the elliptically polarized light is different at the areas A to C. At the area D, the polarized condition of the right circularly polarized light is not changed, and the reflection light from the cholesteric liquid crystal layer 102 passes through the area D without change.

When the light passing through the optical anisotropic layer 106 is directly viewed, since the viewer cannot distinguish the oriented condition of the light, the patterns of the areas A to C cannot be distinguished, and the green reflection light from the cholesteric liquid crystal layer 102 is observed. In this case, a hologram image (not shown in the FIG. 2) formed by the hologram processed portion 103 is seen.

Next, a ease, in which the identification medium 100 is observed via a right circular polarization filter allowing right circularly polarized light to selectively pass therethrough, will be explained. First, a case, in which the identification medium 100 is observed via the right circular polarization filter contacting the identification medium 100, will be explained. In this case, the right circularly polarized light enters the cholesteric liquid crystal layer 102, the light, which passes through the areas A to C of the optical anisotropic layer 106, of the right circularly polarized light is changed to elliptically polarized light (also including linearly polarized light). Thus, when the reflection light is observed via the right circular polarization filter, at the portion of the area D, the reflection light of the right circularly polarized light from the cholesteric liquid crystal layer 102 is seen as it is. The reflection light from the areas A to C passes through the right circular polarization filter, so that the right circularly polarized light component of the reflection light is extracted. In this case, this light component has a wavelength corresponding to color which is different from green. The areas are different from each other in this color difference. This is because the phase differences generated in the optical anisotropic layer 106 are different by wavelength, and the generated phase differences depend on wavelength, so that the wavelength of color corresponding to the phase differences generated in the optical anisotropic layer 106 becomes the wavelength center regarding a predetermined polarization component.

In this example, the areas A to C are set such that phase difference different at the areas A to C is provided to the light. Thus, when the areas A to C are observed via the right circular polarization filter, the images of the areas A to C are seen to be different from each other in color. In this case, the colors of the areas A to C do not appear to be green, and they appear to be another color of which a wavelength is near to that of green. Since the original light spectrum is of light having a center wavelength of green, the light amount of colors (for example, blue and purple) of which the wavelengths are very different from that of green is small. Since a phase difference is not provided to the light at the area D, the area D appears to be green, and the hologram image formed by the hologram processed portion 103 is simultaneously seen at the area D.

Next, a case, in which the identification medium 100 is observed via the right circular polarization filter spaced away from the identification medium 100, will be explained. In this case, natural light including randomly polarized conditions enters the cholesteric liquid crystal layer 102, and a right circularly polarized green light is reflected by the cholesteric liquid crystal layer 102. Thus, the same feature as in the above case in which the identification medium 100 is observed via the right circular polarization filter contacting the identification medium 100 is observed.

Next, a case, in which the identification medium 100 is observed via a left circular polarization filter allowing left circularly polarized light to selectively pass therethrough, will be explained. First, a case, in which the identification medium 100 is observed via the left circular polarization filter contacting the identification medium 100, will be explained. In this case, the left circularly polarized light from the observation surface side enters the area D, so that there is no reflection light from the cholesteric liquid crystal layer 102 which overlaps the area D, and the area D appears to be black. The left circularly polarized light enters the areas A to C. In this case, phase differences are generated in the lights in the areas A to C by the birefringence effect, so that the colors of the areas A to C are seen depending on the phase differences thereof. In this case, the polarized conditions of the lights from the areas A to C are different from that of the right circularly polarized light, so that the colors of the reflection lights from the areas A to C are seen so as to be different from that of the case in which the identification medium 100 is observed via the right circular polarization filter. The areas A to C may also appear to be dark depending on the set condition.

Next, a case, in which the identification medium 100 is observed via the left circular polarization filter spaced away from the identification medium 100, will be explained. In this case, the left circularly polarized light from the observation surface side enters the area D, so that right circularly polarized light is reflected from the cholesteric liquid crystal layer 102 which overlaps the area D. The right circularly polarized light reflected from the area D is blocked by the left circular polarization filter, so that the area D appears to be black. Natural light also enters the areas A to C, and the cholesteric liquid crystal layer 102 reflects a right circularly polarized green light of the natural light. The light, which is reflected from the cholesteric liquid crystal layer 102 and passes through the areas A to C, is influenced by the birefringence effect. Thus, the colors of the areas A to C are seen depending on the phase difference thereof.

In the above manner, the character images of the areas A to C cannot be directly seen. When the identification medium 100 is observed via the left circular polarization filter or the right circular polarization filter, latent image effects can be obtained such that the colors of the character images of the areas A to C are seen to be different.

(Superiority of Identification Medium 1)

In this embodiment, the latent image effect can be obtained in which character images cannot be directly seen but the colors of the character images are seen so as to be different when they are viewed via the left circular polarization filter and the right circular polarization filter. In this case, a different color of each character image can be observed, so that high identification function can be obtained.

Even when the circular polarization filter for observation is spaced away from the identification medium, the identification medium is superior in that the optical function thereof is not changed. Even when the circular polarization filter for observation is proximate to or contacts the identification medium, the same identification function can be obtained. Thus, the identification medium, which has no problem of deterioration or loss of identification function depending on use of the polarization filter for observation, can be provided.

In the conventional technique, since an optical anisotropic layer is stacked on a metal reflection layer, when the polarization filter is spaced away from the identification medium, natural light components of light entering the identification medium increase, and reflection light from the reflection layer becomes similar to natural light. Even when the natural light passes through the optical anisotropic layer, partial phase difference (partial birefringence effect) is not generated, and the pattern of the optical anisotropic layer is not observed. That is, even when natural light which randomly includes every polarized condition enters the optical anisotropic layer, exiting light is natural light which randomly includes every polarized condition, so that influence of partial phase difference cannot be seen. Due to this, in the conventional technique, when the polarization filter is spaced away from the identification medium, the optical function thereof is lost, and the identification effect is not exerted. This is a factor by which the identification method is restricted in identification using the identification medium, or a factor by which the identification function cannot be obtained depending on the use of the filter. In the identification medium 100 of this embodiment, the superior effect in which the above problems of the conventional technique do not occur can be obtained.

In the structure of this embodiment, the color of the latent image is provided by the birefringence which is provided to the reflection light from the cholesteric liquid crystal layer when the reflection light passes through the optical anisotropic layer. Thus, when details of production conditions or the like are not known, reproduction of the color is difficult. As a result, an identification medium which is difficult to counterfeit can be obtained. In the above explanation, the example is used in which identification using the circular polarization filter is performed. Alternatively, identification using change in color can be also performed in observation using a linear polarization filter.

2. Second Embodiment (Identification Medium 2)

Figure 3:
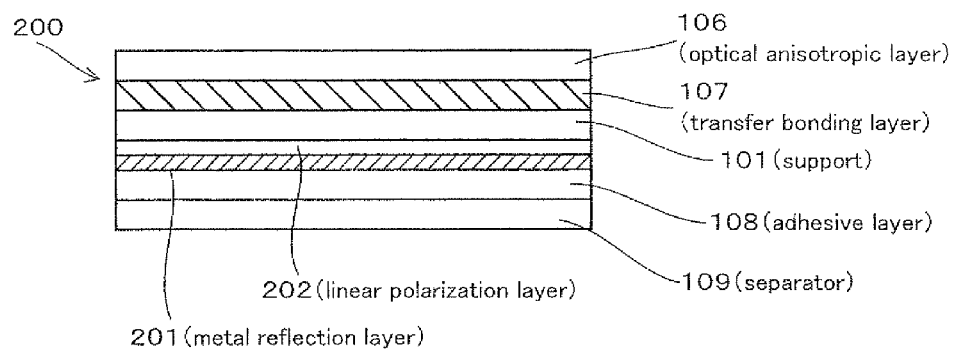
FIG. 3 is a cross sectional view showing an identification medium of an embodiment.

One example of identification medium, which uses a stacked structure having a metal reflection layer and a linear polarization filter layer as a specific polarization light reflection layer, will be explained hereinafter. FIG. 3 is a cross sectional view showing one example of an identification medium of an embodiment. In FIG. 3, an identification medium 200 is shown. In the identification medium 200 in FIG. 3, the same reference numerals as those in FIG. 1 are used, and the explanation of the same reference numerals is the same as that corresponding to FIG. 1. The portions of the identification medium 200 in FIG. 3, which are different from the identification medium 100 in FIG. 1, will be explained hereinafter.

The identification medium 200 in FIG. 3 has a structure in which a metal reflection layer 201 and a linear polarization layer 202 are stacked as a specific polarization light reflection layer. The metal reflection layer 201 is a layer of a metal film which is made of Al or the like and having a metallic luster, and functions as a light reflection layer. The linear polarization layer 202 is a layer functioning as a linear polarization filter allowing linearly polarized light to selectively pass therethrough. The metal reflection layer 201 and the linear polarization layer 202 may have at least one of diffraction grating and a hologram processed portion.

Optical axes of the optical anisotropic layer 106 and the linear polarization layer 202 are offset from each other. The optical anisotropic layer 106 is set such that a phase difference is generated in linearly polarized light exiting from the linear polarization layer 202. In the identification medium 200, incident light is reflected by the metal reflection layer 201, and light used for identification does not reach the adhesive layer 108, so that it is unnecessary that the adhesive layer 108 be dark.

The identification medium 200 is observed from the side of the optical anisotropic layer 106. Linearly polarized light of specific direction, which is included in light entering from the side of the optical anisotropic layer 106, passes through the linear polarization layer 202. This light is reflected toward the upper side in FIG. 3 by the metal reflection layer 201, and a phase difference is provided in the optical anisotropic layer 106.

In the optical anisotropic layer 106, the anisotropy is adjusted in the pattern which is explained based on FIG. 2 in the above manner. Thus, the lights exiting from the areas A to C are different from each other in polarized condition of elliptical polarization thereof. The light exiting from the area D is maintained to be linearly polarized light in the same condition as in exiting from the linear polarization layer 202

When the identification medium 200 is directly viewed, changes in polarized condition (phase difference) are not seen, and the images in FIG. 2 are not visible.

When the identification medium 200 is observed via a linear polarization filter, linearly polarized light components of specific direction, which are included in light from the images formed by the areas A to C in FIG. 2, are observed. Since lights from the images are different from each other in elliptical polarization condition, linearly polarized light components of specific directions of the lights are also different from each other. Since the phase difference in the optical anisotropic layer 106 is different by wavelength, the difference of the linearly polarized light components is observed as difference in color (center wavelength). Thus, images formed by the areas A to C are seen to be different from each other in color. The area D is not changed in color since the area D has no refraction anisotropy.

The linear polarization plate for observation is rotated relatively to the identification medium 200, so that the polarized wave surface of linearly polarized light passing therethrough is changed, and each observed image is thereby changed in gradation and color.

The polarized condition of the light exiting from the optical anisotropic layer 106 is restricted by the linear polarization layer 202, so that problem of fading of the observed image or the like does not occur even when the linear polarization filter for observation is spaced away from the identification medium 200.

3. Third Embodiment
(Identification Medium 3)

Figure 4:
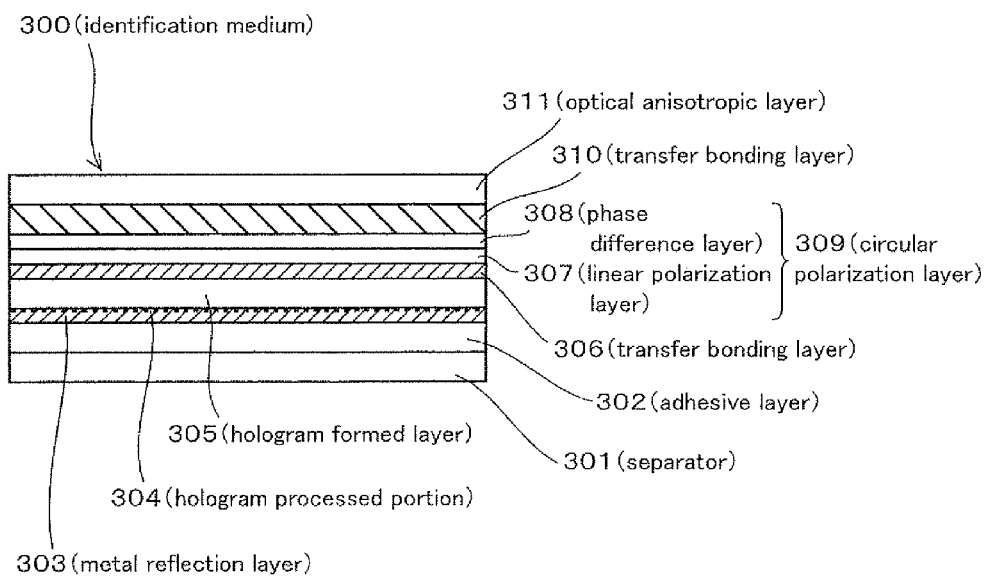
FIG. 4 is a cross sectional view showing an identification medium of an embodiment.

One example of identification medium, which has a specific polarization light reflection layer having a stacked structure, will be explained hereinafter. In the stacked structure, a metal reflection layer and a circular polarization filter layer are stacked, and the circular polarization filter layer allows circularly polarized light of specific polarized direction to selectively pass therethrough when natural light enters toward the observation surface side. In FIG. 4, an identification medium 300 is shown. The identification medium 300 has a stacked structure, and in the stacked structure, a separator 301, an adhesive layer 302 (adhesive layer), a metal reflection layer 303, a hologram formed layer 305, a transfer bonding layer 306, a linear polarization layer 307, and a phase difference layer 308, a transfer bonding layer 310, and an optical anisotropic layer 311 are stacked from a side of the identification medium 300 on which an article is applied.

The separator 301 is applied onto an exposed surface of the adhesive layer 302, and when the identification medium 300 is applied onto the article, the separator 301 is peeled from the adhesive layer 302. The adhesive layer 302 has a function for applying the identification medium 300 onto the article and fixing the identification medium 300 thereto. The metal reflection layer 303 is a vapor deposited layer made of Al or the like. The hologram formed layer 305 is a transparent resin layer, and a side of the hologram formed layer 305 proximate to the metal reflection layer 303 is subjected to embossing process for formation of a hologram. The hologram image can be observed by evaporating the metal reflection layer 303 on the embossed structure. The transfer bonding layer 306 is a transparent layer bonding the hologram formed layer 305 and the linear polarization layer 307.

The linear polarization layer 307 and the phase difference layer 308 form a circular polarization layer 309. The circular polarization layer 309 functions as a circular polarization filter allowing right circularly polarized light to selectively pass therethrough toward the observation surface side (the upper side in FIG. 4) when natural light enters from the lower side in FIG. 4. That is, the linear polarization layer 307 is a layer of a linear polarization filter allowing linearly polarized light of specific direction to selectively pass therethrough. The phase difference layer 308 is a quarter wavelength plate. Directions of absorption axis of the linear polarization layer 307 and slow axis of the phase difference layer 308 are shifted 45 degrees from each other, so that right circularly polarized light selectively passes through the circular polarization layer 309 toward the upper side in FIG. 4 when natural light enters from the lower side in FIG. 4. The polarized direction of the circularly polarized light, which selectively passes through the circular polarization layer 309 toward the upper side in FIG. 4, may be left. This selection of the polarized direction is performed by selecting directions of the absorption axis of the linear polarization layer 307 and the slow axis of the phase difference layer 308 which are shifted by 45 degrees.

The transfer bonding layer 310 is a transparent layer which bonds the circular polarization layer 309 and the optical anisotropic layer 311. The optical anisotropic layer 311 is the same layer as the optical anisotropic layer 106 shown in FIG. 1. The optical anisotropic layer 311 shown in FIG. 4 has the same optical anisotropic pattern shown in FIG. 2 (seen from the front surface) as the optical anisotropic layer 106 shown in FIG. 1. That is, in the optical anisotropic layer 311, refractive indexes of perpendicular directions in a plane are different, and the areas A to C shown in FIG. 2 are different from each other in difference condition of refractive indexes. The area D is formed as a simple light transmission area having no anisotropy of refractive index.

(Production Process)

First, a film having a linear polarization layer 307 and a phase difference layer 308 which are applied to each other is made. A surface of a hologram formed layer 305 is subjected to an embossing process in advance, a vapor deposited film made of Al is formed on the surface of thereof, and a metal reflection layer 303 having a hologram processed portion 304 is made. Next, the hologram formed layer 305 having the metal reflection layer 303 is applied onto a side of the linear polarization layer 307 of the film, which has the linear polarization layer 307 and the phase difference layer 308, via a transfer bonding layer 306. An optical anisotropic layer 311 is fixed to the phase difference layer 308 of the film via a transfer bonding layer 310. The optical anisotropic layer 311 is made in the same manner as the optical anisotropic layer 106 as explained in the first embodiment, and one peeled from a base is used as the optical anisotropic layer 311. Finally, an adhesive layer 302 is formed, and a separator 301 is applied onto an exposed surface of the adhesive layer 302. Thus, an identification medium 300 shown in FIG. 4 is obtained.

(Optical Characteristics)

The observation of the identification medium 300 is performed from the upper side in FIG. 4. When the identification medium 300 is directly viewed, a hologram image (not shown in the Figure) formed by the hologram processed portion 304 is seen. In this case, since the difference of birefringence cannot be distinguished by the naked eye, the characters of the areas A to C shown in FIG. 2 cannot be seen.

A case, in which the identification medium 300 is observed via a right circular polarization filter contacting an upper surface of the optical anisotropic layer 311 of the identification medium 300, will be explained. In this case, right circularly polarized light enters the identification medium 300 from an upper surface of the circular polarization layer 309, and linearly polarized light enters the metal reflection layer 303 by the optical function of the circular polarization layer 309. Reflection light, which is generated from the metal reflection layer 303 and includes the hologram image, is changed to right circularly polarized light by the circular polarization layer 309, and the reflection light passes through the optical anisotropic layer 311 from the lower side to the upper side in FIG. 4. In this case, the birefringence effect corresponding to the difference of the birefringence (difference of retardation value) of each of the areas A to C is provided to each of the areas A to C, and the colors of the areas A to C are seen so as to be different from each other. At the portion of the area D, the reflection light of the right circularly polarized light is observed via the right circular polarization filter, so that reflection light having a metallic luster is seen, and the hologram image (not shown in the Figure) formed by the hologram processed portion 304 is simultaneously seen.

In a case in which the identification medium 300 is observed via a right circular polarization filter spaced away from the identification medium 300 in the same manner, natural light enters the circular polarization layer 309 from the upper side in FIG. 4. The incident light entering the metal reflection layer 303 becomes the linearly polarized light in the same manner as in the case in which the right circular polarization filter contacts the identification medium 300, and the optical function is the same as that described above. That is, in observation using the right circular polarization filter, the features, which are observed when the right circular polarization filter contacts the identification medium 300 and when the right circular polarization filter is spaced away from the identification medium 300, are the same.

A case, in which the identification medium 300 is observed via a left circular polarization filter contacting an upper surface of the optical anisotropic layer 311 of the identification medium 300, will be explained. In this case, the left circularly polarized light from the upper surface of the circular polarization layer 309 enters the identification medium 300. At the portion of the area D, the incident light is blocked by the circular polarization layer 309, so that the portion of the area D appears to be black. At the areas A to C, a portion of component of light, which is elliptically polarized light by the birefringence effect, passes through the circular polarization layer 309 from the upper side to the lower side in FIG. 4, and the portion of component of light is reflected by the metal reflection layer 303. This reflection light passes through the circular polarization layer 309 in the upper direction shown in FIG. 4, passes through the optical anisotropic layer 311 in the upper direction shown in FIG. 4, and is observed via the left circular polarization filter. Each light from the areas A to C, which is observed via the left circular polarization filter, is caused to have the birefringence effect which is different at the areas A to C. The wavelengths of peaks of the lights from the areas A to C, which pass through the left circular polarization filter, are different from each other, so that the lights from the areas A to C are observed to be different in color. In this manner, the hologram image cannot be approximately seen, and the areas A to B are observed in the black background so as to be different in color.

Next, a case, in which the identification medium 300 is observed via a left circular polarization filter spaced away from the identification medium 300, will be explained. In this case, natural light enters the circular polarization layer 309 from the upper side in FIG. 4. By the function of the circular polarization layer 309, the light, which is reflected by the metal reflection layer 303 and enters the optical anisotropic layer 311 from the lower side in FIG. 4, is mainly changed to right circular polarized light, and is partially changed to elliptically polarized light as an incident light which enters the areas A to C. Thus, the reflection light from the area D is right circular polarized light, thereby being blocked by the left circular polarization filter for observation. Therefore, in this case, in the same manner as in the case in which the left circular polarization filter contacts the identification medium 300, the portion of the area D appears to be black. The lights from portions of the areas A to C are caused to have the birefringence effect at the optical anisotropic layer 311. The lights from the portions of the areas A to C include a component of light passing through the left circular polarization filter, so that the colors of the portions of the areas A to C are seen depending on the birefringence effect at each of the areas A to C.

(Superiority)

In the observation using the left circular polarization filter and the right circular polarization filter, the appearances of the identification medium 300, which are obtained when the circular polarization filter contacts the identification medium 300 and when the circular polarization filter is spaced away from the identification medium 300, are the same. This is because the light, which enters the optical anisotropic layer 311 from the lower side in FIG. 4, is restricted to the right circularly polarized light by the function of the circular polarization layer 309. Since the circularly polarized light is used for observation, even when the circular polarization filter is rotated (or even when the identification medium 300 is reversely rotated), the observed feature is not changed. The characteristics are advantageous in obtaining stable identification function even when the observation manner is slightly rough. For example, when the position relationship and the angle position relationship of the circular polarization filter, which is used as a viewer, and the identification medium are far from ideal, the stable identification function cannot be obtained depending the observation manner, and the possibility that precise determination of authenticity may not be performed may be increased. This is not desirable since the possibility that precise determination of authenticity may not be performed increases when determination of authenticity is performed by less-experienced users (consumers or the like). In contrast, in this embodiment, even when the observation manner is slightly rough as described above, the optical identification function which is set in advance can be reliably observed, and the above problem can be reduced.

(Modification example)

In the example shown in FIG. 4, the optical anisotropic layer 311 is exposed. Alternatively, a structure can be used in which the surface of the optical anisotropic layer 311 is covered with a transparent layer. The hologram processed portion 304 is a processed portion in which a diffraction grating is formed. A layer which is formed by adding at least one of iodine and dichroism pigment to PVA (polyvinyl alcohol) and stretching, a layer in which lyotropic liquid crystal is coated and oriented, a polarization layer of wire grid, or the like may be used as the linear polarization layer 307. A layer which is formed by stretching PC (polycarbonate) or COP (cycloolefin polymer), or a layer which is formed by orienting an anisotropic liquid crystal may be used as the phase difference layer 308.

4. Alternative Structures

The optical anisotropic layer may be made from an optically transparent film pattern having birefringence. In this case, a process may be used in which an optically transparent film pattern having birefringence and a pattern shown in FIG. 2 is prepared, and the optically transparent film pattern is transferred to the easy peeling layer 105. The position of the hologram processed portion 103 may be one side of another surface of the cholesteric liquid crystal layer 102, or both surfaces of the cholesteric liquid crystal layer 102. The pattern shown in FIG. 2 is one example. Alternatively, a design or a pattern may be used.

A method for broadening the wavelength region of the reflection light from the cholesteric liquid crystal layer will be explained. In this example, an area of the cholesteric liquid crystal layer is finely divided, and plural dotted cholesteric liquid crystal areas form a cholesteric liquid crystal layer. Plural dotted cholesteric liquid crystal areas are formed by injecting undiluted solution of cholesteric liquid crystal layer from a nozzle in the same manner as the ink-jet technique using a principle of ink-jet printer method, so that the cholesteric liquid crystal layer is formed.

In this case, two kinds of undiluted solutions, which are different from each other in included amount of chiral agent, are prepared as undiluted solutions of cholesteric liquid crystal, and first cholesteric liquid crystal areas and second cholesteric liquid crystal areas are formed in a checker board design. The two kinds of cholesteric liquid crystal areas have pitch widths of spiral structure, which are different from each other, depending on difference in the included amount of chiral agent.

In the cholesteric liquid crystal, the center wavelength of reflection light may be determined by the pitch widths of the spiral structure of the cholesteric liquid crystal. Thus, the dotted areas of the cholesteric liquid crystal, which selectively reflects lights of two kinds of center wavelengths different from each other, may be arranged in the checker board design, so that the regions of the wavelengths of light reflected from the entire cholesteric liquid crystal may be broadened. Thus, images of wider range of wavelength can be used for identification. For example, in observation using an optical filter, identification characteristics can be obtained in which the image of the area A appears to be red, and the image of the area C appears to be blue.

In this structure, the case is explained in which the cholesteric liquid crystal areas having two kinds of pitch widths are used and reflection lights of two kinds of center wavelengths are obtained. Alternatively, a structure may be used in which the number of different pitch widths is increased and lights of more kinds of center wavelengths are reflected. Instead of using a checker board design, a structure may be used in which cholesteric liquid crystal areas having different plural kinds of pitch widths are arranged in a stripe manner.

A liquid crystal ink in which cholesteric liquid crystal having different pitch widths is dispersed in an ink may be prepared, the liquid crystal ink may be coated, so that a reflection layer in which cholesteric liquid crystal phases reflecting lights of two center wavelengths are mixed may be formed. Alternatively, a structure may be used in which cholesteric liquid crystal layers reflecting three kinds of center wavelengths of RGB (red-green-blue) are stacked, and the wavelength region of reflection light may be broadened.

In the pattern in FIG. 2, birefringence may be also provided to the area D, and the color of the area D may be seen to be different from those of the areas A to C.

Industrial Applicability

The present invention can be applied to techniques used for determination of authenticity.

The invention claimed is:

1. An identification medium comprising:
   a reflection layer formed by laminating:
      a metal reflection layer,
      a linear polarization layer that selectively transmits linearly polarized light and is arranged at an observation surface side of the metal reflection layer, and a quarter wavelength plate arranged at an observation surface side of the linear polarization layer; and
   an optical anisotropic layer which is disposed at an observation surface side of the reflection layer and at a position overlapping with the reflection layer, the optical anisotropic layer having an optical anisotropy in a plane,
   wherein a first image formed by an area having optical anisotropy different from that of another area is provided at the optical anisotropic layer.

2. The identification medium according to claim 1, wherein the reflection layer has a hologram processed portion.

3. The identification medium according to claim 1, wherein the metal reflection layer is bonded to the linear polarization layer via a transfer bonding layer.

4. The identification medium according to claim 1, wherein:
   the optical anisotropic layer comprises a first region and a second region, which have different optical anisotropic characteristics from each other;
   a difference of refractive indexes of perpendicular directions in the first region and a difference in the refractive indexes of perpendicular directions in the second region are different from each other; and
   the first region and the second region are configured to be observed through a linear polarization filter or a circularly polarized light filter as having different colors.

* * * * *